Patented June 30, 1942

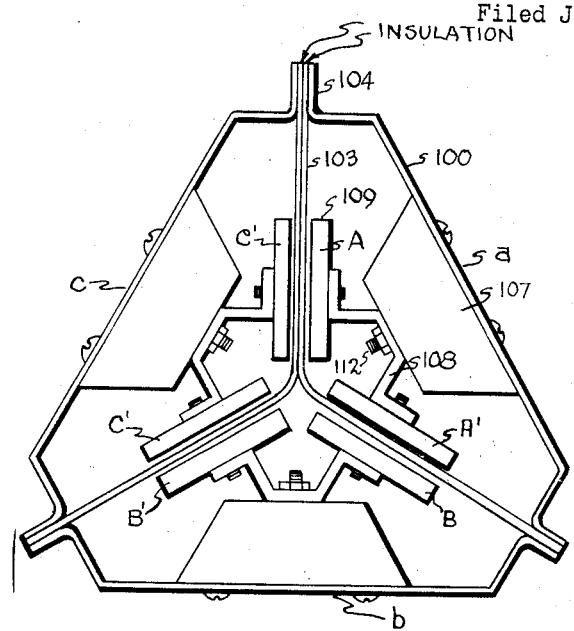

2,288,078

UNITED STATES PATENT OFFICE 2,288,078

ELECTRICAL DISTRIBUTION SYSTEM

Lawrence E. Fisher and Alva A. Togesen, Detroit, Mich., assignors to Bulldog Electric Products Company, Detroit, Mich., a corporation of West Virginia Application July 9, 1941, Serial No. 401,680

8 Claims. (Cl. 171—97)

This application relates to electrical distribution systems of the type shown in a prior application, Serial No. 331,974, filed April 27, 1940.

For an understanding of the system herein disclosed, reference should be had to the appended drawing and to the specification which follows. In the drawing, the single figure shows an embodiment, in end view.

The unit length of bus casing disclosed is to be joined end to end to another to form a bus casing run. It is split lengthwise into three long bus casing sections of which the casing sections are the channels 100, arranged edge to edge to form a hexagonal casing. Three pedestal type insulators 107 of the character shown are secured to the webs of the three channels by suitable means, and to these pedestals are fastened the bus bars 109. The insulation sheets 103 are disposed, between the channels, and thus close them and isolate them from one another, and are disposed between the flanges 104 so as to be held in place by casing joining bolts, not shown, to form closures for them.

Each unit length of bus casing consists of three identical thirds or bus casing sections, each comprising a channel 100, insulator supports 107, and a bus run 109. Each bus casing unit length formed of three such bus casing sections will have its ends formed for scarf-lap joining, with the bus bars and the channels lapping. The three bus casing sections of each unit length, although of the same length, are non-co-terminous. Thus if the three sections are named $a$—$b$—$c$, at the left end of a unit length, section $a$ will project beyond section $b$, and section $b$ will project beyond section $c$, and at the opposite end of that unit length section $c$ will project beyond section $b$, and section $b$ will project beyond section $a$.

The lapping or meeting planes of the various parts (flanges 104, and bus bars 109) will be parallel. The joining bolts for flanges 104 and for bus bars 109 will have their axes perpendicular to such meeting planes. Thus it is possible to move adjacent ends of unit lengths, which are end to end, towards each other, for interjoining, or away from each other, for separation, in directions transverse to the run of the system, thus facilitating assembly or removal of an intermediate unit length into or from a long run of bus casing made up of unit lengths joined end to end.

The pedestal insulators 107 have straps 108 which support the bus bars 109. It will be observed that six bus bars are employed. The six bus bars are identified by the lettering thereon to show their phase and pairing interrelation. Bus bars $AA^1$ form one phase, $BB^1$ another, and $CC^1$ a third. Bus bars $AC^1$ form one pair, $A^1B$ a second and $B^1C$ a third. The bus bars of each pair ($AC^1$, $A^1B$, $B^1C$) are relatively close to each other. However, the pairs ($AC^1$, $A^1B$, $B^1C$) are relatively far apart. This interrelation of pairs has proven an extremely desirable improvement in electrical distribution systems of the bus bar type.

Each section of bus casing ($a$—$b$—$c$) contains all of the bus bars of one phase; section $a$ contains bus bars $A$—$A^1$, of phase A; section $b$ contains bus bars $B$—$B^1$, of phase B; section $c$ contains bus bars $C$—$C^1$, of phase C. Each phase is isolated in its own compartment by the insulation barriers shown. The three phases A—B—C form the three phases of a three phase system; and the casing form shown is primarily intended for three phase distribution.

The fact that the two bus bars forming a pair are close to each other is to a large extent responsible for a considerable reduction of voltage or reactance loss in the system; however, the provision of wide spaces between the pairs provides access into the casing between the pairs for joining or mounting, or for various other purposes. Thus, the nuts 112 which fasten the straps 108 to the pedestal support insulators 107 are shown as accessible through the slots between the pairs of bus bars.

It has been considered that because the pairs are far apart the system herein shown may well be considered as a parallel system of single phase distribution and this analysis might be helpful here.

Particularly in connection with the distribution of alternating current, the problem of reactance voltage loss is great and the system herein shown is useful particularly in such distribution and a great advantage is obtained by the relatively close spacing of the bus bars within the pairs.

Further, great spaces between the pairs provides a large air circulation area and makes it possible to have radiation of heat from the pairs.

The bus bars herein shown are thin and wide and this is also helpful in reducing losses in the distribution of alternating current particularly.

The provision of closely spaced bus bars within the pairs effects a reduction of the magnetic field and permits the use of steel for the casing with no increase in reactance loss, heretofore compensated for by the use of aluminum as part of the casing.

It will also be observed that the embodiment of the figure includes but two sheets of insulation, two being enough to isolate the various bus bars from one another, as indicated. The third insulation sheet might well be included but has been omitted, for purposes of illustration in order to show that two sheets of insulation are enough for the purposes of isolating the various bus bars.

An important feature of the system herein shown is the ease of assembly of the bus casing, from the point of view of assembly of a unit length during manufacture, from the point of view of assembling unit lengths end to end to form an installation, and from the point of view of replacement of an intermediate unit length from a long installation.

It will be seen that the bus casing as a whole is made up of unit lengths. Each unit length is longitudinally split to comprise separate and distinct individually complete complementary bus casing sections, these being disposed alongside one another and inter-joined at their longitudinally extending flanged edges. Each bus casing section of a unit length comprises a unit length of channel, unit lengths of bus bar, and its own individual means for supporting the bus bar lengths in the casing lengths, free and independent of any part of the complementary casing sections.

The construction is such that before complementary bus casing sections are brought adjacent to each other and inter-joined to form a unit length each bus casing section is complete with its casing or channel, its bus bars, and bus bar supporting means. The assembly of a unit length is completed simply by laying the bus casing sections alongside and interjoining them. The assembly of unit lengths end to end to form a bus casing run is completed simply by anchoring one end of one unit length to a free end of a previously mounted unit length and then so on until the assembly is completed.

The construction herein disclosed permits adjacent ends of adjacent unit lengths to be moved relatively to each other in a direction transverse to the run of the casing and this facilitates replacement, as for example, when removing a unit length from a long run wherein the unit length is intermediate the ends of the run. Such unit length may be removed by moving it in a direction transverse of the run and another section may be moved into the space just vacated by being moved thereinto in a direction transverse to the run.

Now having described the structures hereof, reference should be had to the claims which follow.

We claim:

1. In a polyphase distribution system, a source of polyphase alternating current, a plurality of wide thin bars or conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance, between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, the two conductors of each phase being arranged adjacent, with thin edge near thin edge, and spaced angularly less than 180° to form a V, there being three phases and three pairs of conductors and thus three such V's, with the three V's interspaced to form a Y arrangement, and a triangular casing surrounding the conductors and having wide thin heat radiating surfaces close to and parallel to the wide surfaces of the conductors.

2. In a polyphase distribution system, a source of polyphase alternating current, a plurality of wide thin bars or conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance, between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, the two conductors of each phase being arranged adjacent, with thin edge near thin edge, and spaced angularly less than 180° to form a V, there being three phases and three pairs of conductors and thus three such V's, with the three V's interspaced to form a Y arrangement, each pair carrying current in substantially equal amounts and of opposite directions, thus comprising a single phase transmission means, and a triangular casing surrounding the conductors and having wide thin heat radiating surfaces close to and parallel to the wide surfaces of the conductors.

3. In a polyphase distribution system, a source of polyphase alternating current, a plurality of wide thin bars or conductors connected thereto and arranged in a pattern of a plurality of definite and distinct pairs, each pair comprising two evenly and closely spaced conductors carrying currents of different phases, arranged wide face near wide face, each phase comprising two conductors of different pairs, the relative arrangement of and the spacing between the two conductors of a pair being small enough to permit the magnetic field effects of the currents in the conductors of the pair to neutralize one another, but the spacing being large enough to provide adequate relative insulated clearance between the conductors of the pair, the two conductors of each phase being arranged adjacent, with thin edge near thin edge and spaced angularly less than 180° to form a V, there being three phases and three pairs of conductors and thus three such V's, with the three V's interspaced to form a Y arrangement, and a triangular casing surrounding the conductors and having wide thin heat radiating surfaces close to and parallel to the wide surfaces of the conductors.

4. In a polyphase distribution system, a source of polyphase alternating current, a plurality of wide thin bars or conductors connected thereto and arranged in a pattern of a plurality of definite and distinct pairs, each pair comprising two evenly and closely spaced conductors carrying currents of different phases, arranged wide face near wide face, each phase comprising two conductors of different pairs, the relative arrangement of and the spacing between the two conductors of a pair being small enough to permit the magnetic field effects of the currents in the conductors of the pair to neutralize one another, but the spacing being large enough to provide adequate relative insulated clearance between the conductors of the pair, the two conductors of each phase being arranged adjacent, with thin edge near thin edge, and spaced angularly less than 180° to form a V, there being three phases and three pairs of conductors and thus three such V's, with the three V's interspaced to form a Y arrangement, each pair carrying current in substantially equal amounts and of opposite directions, thus comprising a single phase transmission means, and a triangular casing surrounding the conductors and having wide thin heat radiating surfaces close to and parallel to the wide surfaces of the conductors.

5. In a polyphase distribution system, a source of polyphase alternating current, a plurality of wide thin bars or conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance, between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, the two conductors of each phase being arranged adjacent, with thin edge near thin edge, and spaced angularly less than 180° to form a V, there being three phases and three pairs of conductors and thus three such V's, with the three V's interspaced to form a Y arrangement.

6. In a polyphase distribution system, a source of polyphase alternating current, a plurality of wide thin bars or conductors connected thereto and arranged in remotely spaced definite and distinct pairs, each pair comprising two evenly and closely spaced conductors of different phases, arranged wide face near wide face, each phase comprising two conductors of different pairs, the relative arrangement of and the spacing between the two conductors of a pair being small enough to permit the currents in the conductors of the pair to neutralize their relative magnetic effects but the spacing being large enough to provide adequate relative insulated clearance between the conductors of the pair, the spacing between the pairs being large enough to provide adequate heat dissipation from the pairs and satisfactory access between the pairs for tools and hands and fasteners used in joining and supporting the conductors, the spacing between pairs being considerably greater than the spacing between conductors of a pair, the two conductors of each phase being arranged adjacent, with thin edge near thin edge, and spaced angularly less than 180° to form a V, there being three phases and three pairs of conductors and thus three such V's, with the three V's interspaced to form a Y arrangement, each pair carrying current in substantially equal amounts and of opposite directions, thus comprising a single phase transmission means.

7. In a polyphase distribution system, a source of polyphase alternating current, a plurality of wide thin bars or conductors connected thereto and arranged in a pattern of a plurality of definite and distinct pairs, each pair comprising two evenly and closely spaced conductors carrying currents of different phases, arranged wide face near wide face, each phase comprising two conductors of different pairs, the relative arrangement of and the spacing between the two conductors of a pair being small enough to permit the magnetic field effects of the currents in the conductors of the pair to neutralize one another, but the spacing being large enough to provide adequate relative insulated clearance between the conductors of the pair, the two conductors of each phase being arranged adjacent, with thin edge near thin edge, and spaced angularly less than 180° to form a V, there being three phases and three pairs of conductors and thus three such V's, with the three V's interspaced to form a Y arrangement.

8. In a polyphase distribution system, a source of polyphase alternating current, a plurality of wide thin bars or conductors connected thereto and arranged in a pattern of a plurality of definite and distinct pairs, each pair comprising two evenly and closely spaced conductors carrying currents of different phases, arranged wide face near wide face, each phase comprising two conductors of different pairs, the relative arrangement of and the spacing between the two conductors of a pair being small enough to permit the magnetic field effects of the currents in the conductors of the pair to neutralize one another, but the spacing being large enough to provide adequate relative insulated clearance between the conductors of the pair, the two conductors of each phase being arranged adjacent, with thin edge near thin edge, and spaced angularly less than 180° to form a V, there being three phases and three pairs of conductors and thus three such V's, with the three V's interspaced to form a Y arrangement.

LAWRENCE E. FISHER.
ALVA A. TOGESEN.